US008742693B2

(12) United States Patent  
Ikeda

(10) Patent No.: US 8,742,693 B2  
(45) Date of Patent: Jun. 3, 2014

(54) SWITCHING POWER SUPPLY CIRCUIT, SEMICONDUCTOR DEVICE, AND LED LIGHTING DEVICE

(75) Inventor: Masakazu Ikeda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 59 days.

(21) Appl. No.: 13/489,167

(22) Filed: Jun. 5, 2012

(65) Prior Publication Data

US 2012/0306394 A1 Dec. 6, 2012

(30) Foreign Application Priority Data

Jun. 6, 2011 (JP) .................................. 2011-126037

(51) Int. Cl.
*H05B 37/02* (2006.01)
*H05B 39/04* (2006.01)
*H05B 41/36* (2006.01)
*G05F 1/00* (2006.01)
*H05B 41/16* (2006.01)
*H05B 41/24* (2006.01)
*H02J 1/00* (2006.01)
*H02J 3/00* (2006.01)
*H02J 3/22* (2006.01)

(52) U.S. Cl.
USPC .............. 315/307; 315/291; 315/254; 363/15

(58) Field of Classification Search
None
See application file for complete search history.

(56) References Cited

U.S. PATENT DOCUMENTS

| 5,060,131 | A | * | 10/1991 | Sikora ............................. 363/97 |
| 5,369,472 | A | | 11/1994 | Raj et al. |
| 5,959,851 | A | | 9/1999 | Shutts |
| 8,384,295 | B2 | * | 2/2013 | Simi ............................. 315/219 |
| 2009/0001954 | A1 | | 1/2009 | Morota |
| 2010/0123447 | A1 | | 5/2010 | Vecera et al. |

FOREIGN PATENT DOCUMENTS

JP 2009-011073 A 1/2009

* cited by examiner

*Primary Examiner* — Douglas W Owens
*Assistant Examiner* — Dedei K Hammond
(74) *Attorney, Agent, or Firm* — Birch, Stewart, Kolasch & Birch, LLP

(57) ABSTRACT

A switching power supply circuit includes a full-wave rectification circuit that performs full-wave rectification of an AC input voltage so as to generate a primary voltage, a transformer that transforms the primary voltage into a secondary voltage utilizing electromagnetic induction between first and second isolated windings, a rectifying and smoothing circuit that generates a DC output voltage from the secondary voltage so as to supply the DC output voltage to a load, a primary current control circuit that performs on/off control of primary current based on a result of comparison between a primary current detection voltage corresponding to the primary current flowing in the first winding and a first reference voltage, and a reference voltage correction circuit for monitoring an on-duty ratio of secondary current flowing in the second winding so as to correct the first reference voltage.

18 Claims, 13 Drawing Sheets

SWITCHING POWER SUPPLY CIRCUIT, SEMICONDUCTOR DEVICE, AND LED LIGHTING DEVICE

CROSS-REFERENCE TO RELATED APPLICATIONS

This application is based on Japanese Patent Application No. 2011-126037 filed on Jun. 6, 2011, the contents of which are hereby incorporated by reference.

BACKGROUND OF THE INVENTION

1. Field of the Invention

The present invention relates to a switching power supply circuit, a semiconductor device used for the same, and an LED lighting device using the same.

2. Description of Related Art

Conventionally, in the field of switching power supply circuits, there is disclosed a technique for stabilizing output current with respect to load change, including the steps of detecting time period during which secondary current of a transformer is flowing, and setting a ratio of the time period to a switching period, namely an on-duty ratio of a switching element (see JP-A-2009-11073, which is referred to as Patent document 1 hereinafter).

FIG. 11 is a block diagram illustrating a conventional example of a switching power supply device (FIG. 1 of Patent document 1). A switching power supply device X of this conventional example includes a semiconductor device X100, a transformer X110, diodes X121 and X141, capacitors X122 and X142, and resistors X151 and X152, which constitute a flyback-type switching power supply circuit generating a predetermined DC output voltage Vout from an AC input voltage Vin so as to supply the DC output voltage Vout to a load X130. The transformer X110 includes a primary winding X111, a secondary winding X112, and an auxiliary winding X113.

In the semiconductor device X100, there are integrated a switching element X1, a drain current detection circuit X2, a drain current limiter circuit X3, an error amplifier X4, a pulse frequency modulation (PFM) control circuit X5, a secondary current on-period detection circuit X6, a secondary current detection delay time correction circuit X7, a secondary current on-duty control circuit X8, a clock signal selection circuit X9, a flip-flop circuit X10, a NAND circuit X11, a gate driver X12, a on-time blanking pulse generation circuit X13, an AND circuit X14, and a regulator X15.

FIG. 12 is a circuit diagram illustrating a principal part of the semiconductor device X100 (FIG. 2 of Patent document 1). The secondary current on-period detection circuit X6 includes one-pulse signal generation circuits X21 and X23, a comparator X22, and a flip-flop circuit X24. The secondary current detection delay time correction circuit X7 includes a constant current source X31, a capacitor X32, an inverter X33, and a switch X34. The secondary current on-duty control circuit X8 includes switches X41 and X42, a capacitor X43, a constant current source X44, N-channel metal oxide semiconductor (MOS) field effect transistors X45 and X46, a comparator X47, a reference voltage source X48, an AND circuit X49, and a one-pulse signal generation circuit X50.

FIG. 13 is a timing chart illustrating voltage waveforms and current waveforms of individual portions of the switching power supply device X, which includes in order from the upper, an auxiliary winding voltage VTR obtained by dividing a voltage at an end of the auxiliary winding X113, primary current Ids flowing in the switching element X1, and secondary current I2p flowing in the secondary winding X112. Concerning symbols in FIG. 13, T1 denotes a first period during which the secondary current I2p is flowing, T2 denotes a second period during which the secondary current I2p does not flow, T3 denotes a third period as a sum of the first period T1 and the second period T2, Ipk1 denotes a peak value of the primary current Ids, and Ipk2 denotes a peak value of the secondary current I2p.

Average output current Iout supplied from the switching power supply device X to the load X130 is an average value of the secondary current I2p. The average value of the secondary current I2p in the first period T1 is ½ of the peak current Ipk2 of the secondary current I2p. The average value of the secondary current I2p in the third period T3 is a value obtained by multiplying the average value of the secondary current I2p in the first period T1 by an on-duty ratio of the switching element X1. Therefore, when the number of turns of the primary winding X111 is denoted by N1, and the number of turns of the secondary winding X112 is denoted by N2, the average output current Iout is expressed by the following expression (1).

$$Iout = (1/2) \times (N1/N2) \times (T1/T3) \times Ipk1 \quad (1)$$

The conventional switching power supply device X controls the peak current Ipk1 of the switching element X1 to be constant using the drain current limiter circuit X3 so that T1/T3 in the expression (1) becomes constant, and hence controls the average output current Iout to be constant.

The comparator X22 included in the secondary current on-period detection circuit X6 sets an comparison output signal to a high level (logical level when the secondary current is detected to be off) when the auxiliary winding voltage VTR applied to an inverting input terminal (−) becomes a reference voltage or lower applied to the non-inverting input terminal (+). A waveform of the auxiliary winding voltage VTR gradually drops as time passes after the switching element X1 is turned off as illustrated in FIG. 13. Therefore, there is a delay time ΔT1 from time when the secondary current I2p becomes an actual off state (zero value) until the auxiliary winding voltage VTR becomes lower than the reference voltage of the comparator X22. As a result, in the secondary current on-period detection circuit X6, there occurs the delay time ΔT1 until detection of the off state of the secondary current I2p.

Therefore, in the conventional switching power supply device X, a delay correction period ΔT2 corresponding to the delay time ΔT1 is subtracted from an on-period of the secondary current I2p detected by the comparator X22 in advance. Thus, the on-period of the secondary current I2p is corrected so that accuracy of the average output current Iout is enhanced.

Here, as illustrated in FIG. 13, when an on-period of the switching element X1 is denoted by T4, in one period of switching drive, an average input current Iin flowing into the switching power supply device X is expressed by the following expression (2).

$$Iin = (1/2) \times Ipk1 \times (T4/T3) \quad (2)$$
$$= (1/2) \times Ip1 \times (T1/T3) \times (N1/N2) \times (Vout/Vin)$$

Here, it is supposed that the input voltage Vin of the switching power supply device X is changed. As described above, the conventional switching power supply device X controls the peak current Ipk1 of the switching element X1 to be constant using the drain current limiter circuit X3 so that T1/T3 in the above expression (1) is constant, and hence controls the average output current Tout to be constant. In addition, N1/N2 is also constant. Further, because the average output current Iout flowing in the load X130 is constant, the output voltage Vout is also constant. Therefore, it is understood that if the input voltage Vin of the switching power supply device X is changed, the average input current Iin of the switching power supply device X changes inversely proportional to the input voltage Vin.

However, in a power supply circuit supplied with AC power, a power factor thereof is important. In order to obtain a high power factor, it is desirable that the power supply circuit should look like a pure resistance viewed from the AC power supply side. In other words, it is necessary that input current of the power supply circuit is proportional to the input voltage.

In view of the above discussion, the conventional switching power supply device X has a problem that the power factor is bad when the AC power is input, and hence power loss in a power supply system from a power station to a terminal product (load) is increased, and further noise jamming occurs in other devices.

SUMMARY OF THE INVENTION

In view of the above-mentioned problem, it is an object of the present invention to provide a switching power supply circuit capable of achieving higher power factor than conventional one while maintaining the current flowing in the load to be constant, a semiconductor device used for the switching power supply circuit, and an LED lighting device using them.

In order to achieve the above-mentioned object, a switching power supply circuit according to the present invention includes a full-wave rectification circuit that performs full-wave rectification of an AC input voltage so as to generate a primary voltage, a transformer that transforms the primary voltage into a secondary voltage utilizing electromagnetic induction between first and second isolated windings, a rectifying and smoothing circuit that generates a DC output voltage from the secondary voltage so as to supply the DC output voltage to a load, a primary current control circuit that performs on/off control of primary current based on a result of comparison between a primary current detection voltage corresponding to the primary current flowing in the first winding and a first reference voltage, and a reference voltage correction circuit for monitoring an on-duty ratio of secondary current flowing in the second winding so as to correct the first reference voltage.

Note that other feature, elements, steps, merits, and characteristics of the present invention will be more apparent from the following specific description of the most preferred embodiment and the relevant attached drawings.

DETAILED DESCRIPTION OF THE PREFERRED EMBODIMENTS

<Light Emitting Diode (LED) Lighting Device>

Figure 1:
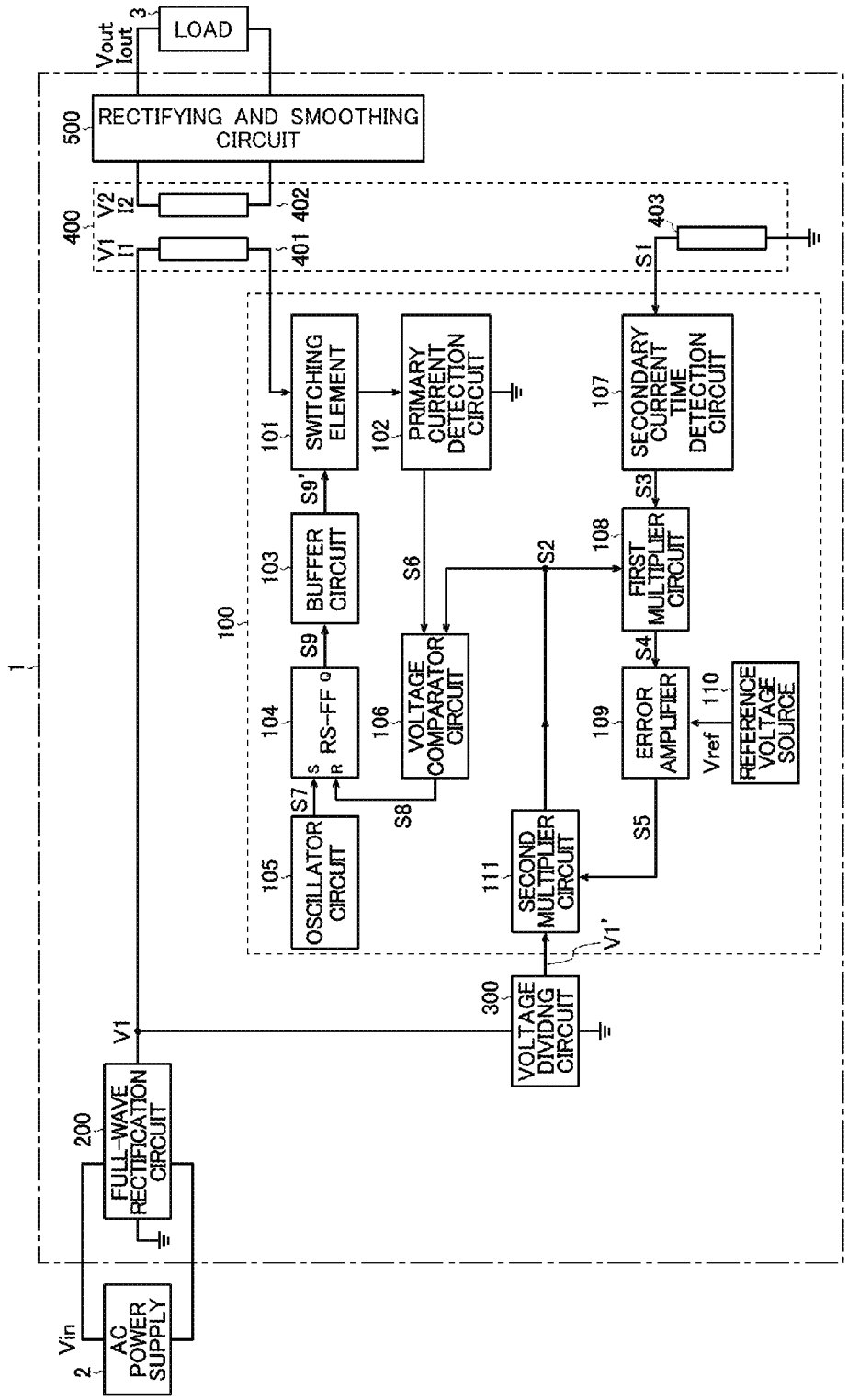
FIG. 1 is a block diagram illustrating a structural example of an LED lighting device.

FIG. 1 is a block diagram illustrating a structural example of the LED lighting device. The LED lighting device of this structural example includes a switching power supply circuit 1, an AC power supply 2, and an LED (load) 3.

The switching power supply circuit 1 generates the DC output voltage Vout by AC/DC conversion of the AC input voltage Vin supplied from the AC power supply 2 (for example, a commercial AC power supply of AC 100 V), and supplies this DC output voltage Vout to the LED 3. The switching power supply circuit 1 is provided as a module including a semiconductor device 100, a full-wave rectification circuit 200, a voltage dividing circuit 300, a transformer 400, and a rectifying and smoothing circuit 500.

In the semiconductor device 100, there are integrated a switching element 101, a primary current detection circuit 102, a buffer circuit 103, an RS flip-flop 104, an oscillator circuit 105, a voltage comparator circuit 106, a secondary current time detection circuit 107, a first multiplying circuit 108, an error amplifier 109, a reference voltage source 110, and a second multiplying circuit 111.

The full-wave rectification circuit 200 performs full-wave rectification of the AC input voltage Vin and generates a primary voltage V1. The primary voltage V1 is a pulsating voltage.

The voltage dividing circuit 300 generates a divided voltage V1' by dividing the primary voltage V1. A dividing ratio of the voltage dividing circuit 300 should be appropriately set considering a voltage value of the divided voltage V1' that can be input to the semiconductor device 100 (particularly the second multiplying circuit 111). The voltage dividing circuit 300 is usually constituted of a resistor ladder, but it may be constituted of a combination of a resistor and other impedance element (capacitor or coil).

The transformer 400 transforms the primary voltage V1 to the secondary voltage V2 utilizing electromagnetic induction between a first winding (primary winding) 401 and a second winding (secondary winding) 402 isolated from each other. Note that the transformer 400 includes a third winding 403 in addition to the first winding 401 and the second winding 402.

The rectifying and smoothing circuit 500 generates the DC output voltage Vout by rectifying and smoothing the secondary voltage V2 at an end of the second winding 402.

<Semiconductor Device>

The switching element 101 performs on/off control of primary current I1 flowing in the first winding 401 of the transformer 400 based on a switching control signal S9' input from the RS flip-flop 104 via the buffer circuit 103. Specifically, the switching element 101 is turned on when the switching control signal S9' is high level and is turned off when the switching control signal S9' is low level. When the switching element 101 is turned on, the primary current I1 flows in the first winding 401 of the transformer 400 via the switching element 101. A field effect transistor or a bipolar transistor can be used as the switching element 101.

The primary current detection circuit 102 lets the primary current I1 flow in a resistor to converts it to a primary current detection voltage S6, and outputs this primary current detection voltage S6 to the voltage comparator circuit 106.

The buffer circuit 103 amplifies current capability of the switching control signal S9 input from the RS flip-flop 104 so as to generate the switching control signal S9' having a voltage value and a current value necessary for driving the switching element 101.

The reset/set (RS) flip-flop 104 switches a logical level of the switching control signal S9 output from an output terminal Q based on a set signal S7 input to a set terminal S and a reset signal S8 input to a reset terminal R. Specifically, the RS flip-flop 104 sets the switching control signal S9 to high level at the rising edge (L to H) of the set signal S7 and resets the switching control signal S9 to low level at the rising edge (L to H) of the reset signal S8. In addition, the RS flip-flop 104 maintains the switching control signal S9 at low level during a period during which the set signal S7 is at low level regardless of a logical level of the reset signal S8. Therefore, the RS flip-flop 104 resets the switching control signal S9 to low level not only at the rising edge of the reset signal S8 but also at a falling edge of the set signal S7.

The oscillator circuit 105 generates the set signal S7 (reference clock signal) driven by pulse at a predetermined switching frequency.

The voltage comparator circuit 106 compares the primary current detection voltage S6 input from the primary current detection circuit 102 with a first reference voltage S2 input from the second multiplying circuit 111 so as to generate the reset signal S8. The reset signal S8 is high level if the primary current detection voltage S6 is higher than the first reference voltage S2 and is low level if the primary current detection voltage S6 is not higher than the first reference voltage S2.

The secondary current time detection circuit 107 detects a time period during which a secondary current I2 is flowing in the second winding 402 of the transformer 400 from a waveform of the winding voltage S1 at one end of the third winding 403, and outputs a secondary current time detection signal S3 in accordance with the detection result. The secondary current time detection signal S3 becomes low level when the secondary current I2 flows and becomes high level when the secondary current I2 does not flow.

The first multiplying circuit 108 multiplies the secondary current time detection signal S3 input from the secondary current time detection circuit 107 by the first reference voltage S2 input from the second multiplying circuit 111 so as to generate a multiplied voltage S4, and outputs this multiplied voltage S4 to the error amplifier 109. The multiplied voltage S4 becomes a voltage value proportional to a product of a ratio of the low level period of the secondary current time detection signal S3 in the switching period (namely, the on-duty ratio of the secondary current I2) and a maximum value Ipk1 of the primary current I1.

The error amplifier 109 amplifies a difference between the multiplied voltage S4 input from the first multiplying circuit 108 and a second reference voltage Vref input from the reference voltage source 110, so as to generate an error voltage S5.

The reference voltage source 110 generates the second reference voltage Vref that does not depends on variations of power supply voltage and ambient temperature.

The second multiplying circuit 111 generates the first reference voltage S2 proportional to the product of the divided voltage V1' input from the voltage dividing circuit 300 and the error voltage S5 input from the error amplifier 109.

Among the above-mentioned components, the switching element 101, the primary current detection circuit 102, the buffer circuit 103, the RS flip-flop 104, the oscillator circuit 105, and the voltage comparator circuit 106 constitute the primary current control circuit that performs on/off control of the primary current I1 based on a comparison result between the primary current detection voltage S6 corresponding to the primary current I1 flowing in the first winding 401 and the first reference voltage S2.

In addition, the secondary current time detection circuit 107, the first multiplying circuit 108, the error amplifier 109, the reference voltage source 110, the second multiplying circuit 111, and the voltage dividing circuit 300 constitute the reference voltage correction circuit that monitors the on-duty ratio of the secondary current I2 flowing in the second winding 402 so as to correct the first reference voltage S2.

<Operations>

Now, a period of the set signal (reference clock signal) S7 is denoted by Tc, a low level period of the secondary current time detection signal S3 (period during which the secondary current I2 flows) is denoted by Tres, a maximum value of the primary current I1 is denoted by Ipk1, a maximum value of the secondary current I2 is denoted by Ipk2, the number of turns of the first winding 401 is denoted by N1, and the number of turns of the second winding 402 is denoted by N2. Then, the average output current Iout flowing in the LED 3 is expressed by the following expression (3).

$$Iout=(½)\times(N1/N2)\times(Tres/Tc)\times Ipk1 \quad (3)$$

Note that N1/N2 in the above expression (3) is a fixed value. Therefore, in order to keep the average output current Iout to be constant, (Tres/Tc)×Ipk1 should be constant. Therefore, the switching power supply circuit 1 works as follows in order to obtain output constant current characteristics.

The first multiplying circuit 108 outputs the multiplied voltage S4 proportional to a product of the duty ratio of the secondary current time detection signal S3 (namely, the on-duty ratio of the secondary current I2) and the first reference voltage S2 used as the reference voltage for the voltage comparator circuit 106 (namely, the maximum value Ipk1 of the primary current I1). The first multiplying circuit 108 performs a chopping process of the first reference voltage S2 in accordance with a logical level of the secondary current time detection signal S3 as its internal operation. More specifically, the first multiplying circuit 108 outputs the first reference voltage S2 as a chopping voltage Sx when the secondary current time detection signal S3 is low level (when the secondary current I2 is flowing), and outputs 0 V as the chopping voltage Sx when the secondary current time detection signal S3 is high level (when the secondary current I2 is not flowing). Therefore, by smoothing this chopping voltage Sx sufficiently, it is possible to generate the multiplied voltage S4 proportional to a product of the on-duty ratio of the secondary current I2 and the maximum value Ipk1 of the primary current I1.

The error amplifier 109 amplifies a difference between the multiplied voltage S4 and the second reference voltage Vref so as to generate the error voltage S5. If the multiplied voltage S4 is lower than the second reference voltage Vref, namely if the average output current Iout is smaller than a target value, the error voltage S5 becomes high. If the error voltage S5 input to the second multiplying circuit 111 becomes high, the first reference voltage S2 also becomes high, and hence the maximum value Ipk1 of the primary current I1 becomes large. On the other hand, if the multiplied voltage S4 is higher than the second reference voltage Vref, namely if the average output current Iout is larger than the target value, the error voltage S5 becomes low. If the error voltage S5 input to the second multiplying circuit 111 becomes low, the first reference voltage S2 also becomes low, and hence the maximum value Ipk1 of the primary current I1 becomes small.

According to the operation described above, feedback works so that the multiplied voltage S4 proportional to the product of the on-duty ratio of the secondary current I2 and the maximum value Ipk1 of the primary current I1, namely the multiplied voltage S4 proportional to the average output current Iout, converges to the second reference voltage Vref. Therefore, it is possible to maintain the average output current Iout to be constant.

Figure 2:
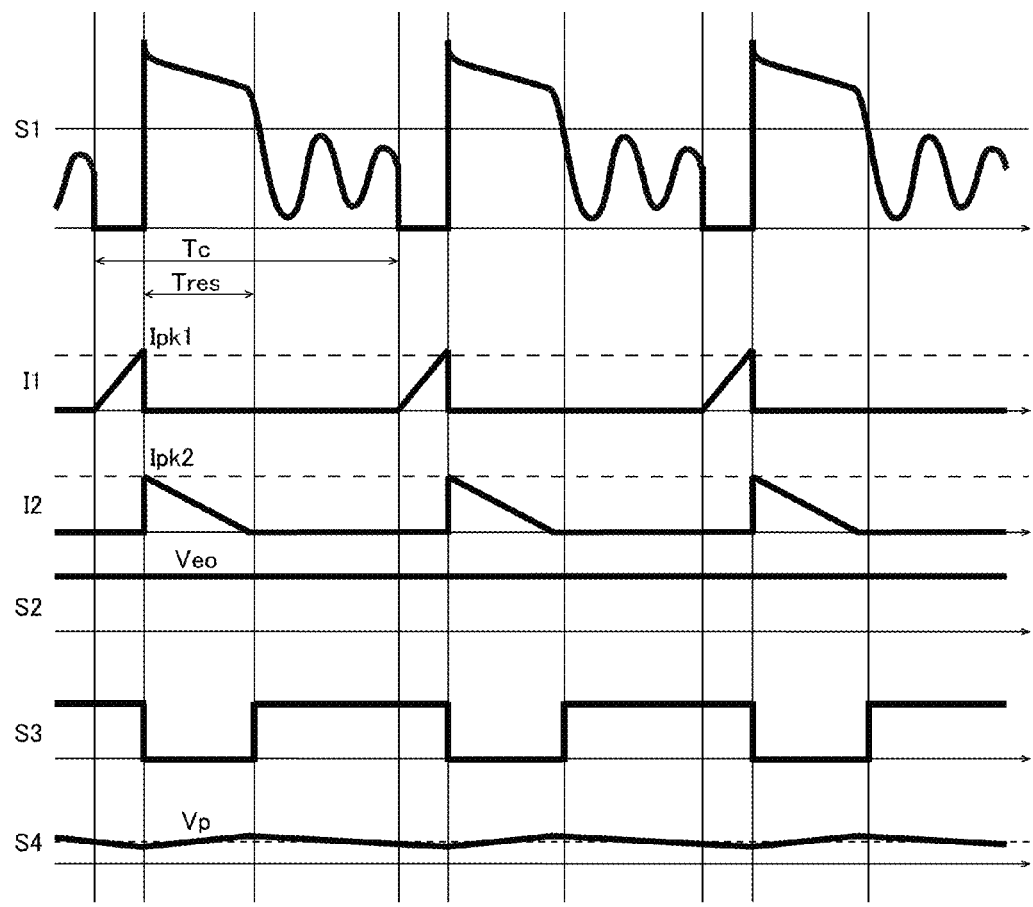
FIG. 2 is a timing chart illustrating voltage waveforms and current waveforms of individual portions of a switching power supply circuit 1.

FIG. 2 is a timing chart illustrating voltage waveforms and current waveforms of individual portions of the switching power supply circuit 1, which includes in order from the upper, the winding voltage S1, the primary current I1, the secondary current I2, the first reference voltage S2, the secondary current time detection signal S3, and the multiplied voltage S4.

As illustrated in FIG. 2, the waveform of the primary current I1 increases substantially linearly in the period during which the switching element 101 is turned on. The primary current detection circuit 102 lets the primary current I1 flow in a resistor to convert the current into the primary current detection voltage S6, and outputs this primary current detection voltage S6 to the voltage comparator circuit 106. Note that a waveform of the primary current detection voltage S6 is similar to the waveform of the primary current I1 (illustration is omitted).

Here, a resistance value of the primary current detection circuit 102 is denoted by R. Then, a voltage value Vpk1 of the primary current detection voltage S6 when the primary current I1 reaches the maximum value Ipk1 is expressed by the following expression (4).

$$Vpk1 = Ipk1 \times R \quad (4)$$

The voltage comparator circuit 106 compares the primary current detection voltage S6 with the first reference voltage S2 so as to generate the reset signal S8. The reset signal S8 is high level if the primary current detection voltage S6 is higher than the first reference voltage S2, and is low level if the primary current detection voltage S6 is not higher than the first reference voltage S2.

After the switching element 101 is turned on, if the primary current detection voltage S6 becomes higher than the first reference voltage S2, the reset signal S8 rises from low level to high level. The RS flip-flop 104 resets the switching control signal S9 to low level at the rising edge of the reset signal S8. The buffer circuit 103 amplifies the switching control signal S9 so as to send the result to the switching element 101. As a result, the switching element 101 is turned off. Therefore, both the primary current I1 and the primary current detection voltage S6 become zero value, and the reset signal S8 falls from high level to low level.

After that, when the set signal S7 generated by the oscillator circuit 105 is raised from low level to high level, the RS flip-flop 104 sets the switching control signal S9 to high level. The buffer circuit 103 amplifies the switching control signal S9 and sends the result to the switching element 101. As a result, the switching element 101 is turned on, and hence the primary current I1 starts to flow. From now on, operations similar to the above operations are repeated.

In synchronization with the above switching operation, the winding voltage S1 is generated at one end of the third winding 403. The winding voltage S1 rises rapidly when the secondary current I2 starts to flow, and then decreases gradually along with a decrease of the secondary current I2. When the secondary current I2 becomes zero, the winding voltage S1 drops rapidly and becomes an unstable state in which increase and decrease are repeated.

The secondary current time detection circuit 107 compares the winding voltage S1 with a predetermined threshold value voltage so as to generate the secondary current time detection signal S3. The secondary current time detection signal S3 is high level when the winding voltage S1 is lower than the predetermined threshold value voltage, and is low level when the winding voltage S1 is higher than the predetermined threshold value voltage. Therefore, the secondary current time detection signal S3 becomes low level in the period Tres during which the secondary current I2 is flowing.

The first multiplying circuit 108 outputs the multiplied voltage S4 proportional to the product of the duty ratio of the secondary current time detection signal S3 (namely, the on-duty ratio of the secondary current I2) and the first reference voltage S2 used as the reference voltage of the voltage comparator circuit 106 (namely, the maximum value Ipk1 of the primary current I1). When a voltage value of the first reference voltage S2 is denoted by Vm2, a voltage value Vp of the multiplied voltage S4 is expressed by the following expression (5). Note that an internal circuit of the first multiplying circuit 108 will be described later.

$$Vp = (Tres/Tc) \times Vm2 \quad (5)$$

The error amplifier 109 amplifies a difference between the multiplied voltage S4 and the second reference voltage Vref so as to generate the error voltage S5. The error voltage S5 becomes high if the multiplied voltage S4 is lower than the second reference voltage Vref, and becomes low if the multiplied voltage S4 is higher than the second reference voltage Vref. If the multiplied voltage S4 is equal to the second reference voltage Vref, the error voltage S5 is maintained because the output current does not flow from the error amplifier 109.

In addition, an output portion of the error amplifier 109 includes a smoothing circuit. A time constant of the smoothing circuit is set to a value sufficiently larger than the period of the AC power supply 2. If the AC power supply 2 is a commercial power supply, its frequency is 50 to 60 Hz, and therefore, its period is 16 to 20 ms. In this case, the time constant of the smoothing circuit incorporated in the output portion of the error amplifier 109 is preferably set to approximately 100 ms. By this setting of the time constant, the multiplied voltage S4 is smoothed in a time period longer than the period of the AC power supply 2. Therefore, the error voltage S5 becomes a substantially constant voltage value in one period of the AC power supply 2. In other words, the error amplifier 109 outputs the average value of the secondary current I2 averaged in one period of the AC power supply 2 as the error voltage S5. An internal circuit of the error amplifier 109 will be described later.

The second multiplying circuit 111 generates the first reference voltage S2 proportional to the product of the divided voltage V1' input from the voltage dividing circuit 300 and the error voltage S5 input from the error amplifier 109. Because the smoothing circuit having the time constant sufficiently larger than the period of the AC power supply 2 is incorporated in the output portion of the error voltage S5 as described above, the first reference voltage S2 generated by the second multiplying circuit 111 also becomes a substantially constant voltage value in one period of the AC power supply 2. Therefore, as the first reference voltage S2, a voltage proportional to the divided voltage V1' (therefore to the AC input voltage Vin) is output. Thus, feedback control is performed so that the average output current Iout of the switching power supply circuit 1 becomes constant.

Here, the first reference voltage S2 is used as the reference voltage of the voltage comparator circuit 106 and is also used as the input to the first multiplying circuit 108. If the average output current Tout in one period of the AC power supply 2 is larger than a predetermined target value, an average value of the multiplied voltage S4 (voltage value Vp) in one period of the AC power supply 2 is higher than the second reference voltage Vref. Therefore, because a voltage value Veo of the error voltage S5 is lowered and the maximum value Ipk1 of the primary current I1 is controlled to be decreased, the average output current Iout is decreased. On the other hand, if the average output current Tout in one period of the AC power supply 2 is smaller than a predetermined target value, an average value of the multiplied voltage S4 (voltage value Vp) in one period of the AC power supply 2 becomes lower than the second reference voltage Vref. Therefore, because the voltage value Veo of the error voltage S5 is increased and the maximum value Ipk1 of the primary current I1 is controlled to be increased, the average output current Tout is increased. By this feedback control, the voltage value Vp of the multiplied voltage S4 converges to the second reference voltage Vref, and thus the average output current Iout converges to a predetermined target value.

Because the voltage value Vp of the multiplied voltage S4 converges to the second reference voltage Vref as described above, when the voltage value of the first reference voltage S2 is denoted by Vm2, the following expression (6) is satisfied.

$$Vref = (Tres/Tc) \times Vm2 \quad (6)$$

In addition, when a resistance value of the primary current detection circuit 102 is denoted by R, the following expression (7) is satisfied between the maximum value Ipk1 of the primary current I1 and the voltage value Vm2 of the first reference voltage S2.

$$Ipk1 \times R = Vm2 \quad (7)$$

Further, the following expression (8) is derived from the above expressions (6) and (7).

$$Vref = (Tres/Tc) \times Ipk1 \times R \quad (8)$$

Therefore, based on the above expressions (3) and (8), the average output current Tout is expressed by the following expression (9).

$$Iout = (1/2) \times (N1/N2) \times (Tres/Tc) \times Ipk1 \quad (9)$$
$$= (1/2) \times (N1/N2) \times (Vref/R)$$

The right side of the above expression (9) is a constant value. In this way, the switching power supply circuit 1 monitors a waveform of the winding voltage S1 at one end of the third winding 403 included in the transformer 400 so as to detect the on-duty ratio of the secondary current I2, and it is possible to achieve a characteristic of constant average output current Tout regardless of load change (so-called constant current drooping characteristic) based on the detection result.

The above description is made about the case where the output current Tout is averaged in one period of the AC power supply 2. In the following description, the average input current Iin is considered, which flows in the switching power supply circuit 1 in one period of the switching drive.

A drive period of the switching element 101 is denoted by Tc, and the on period of the switching element 101 is denoted by Ton. Then, the average input current Iin flowing in the switching power supply device 1 in one period of the switching drive is expressed by the following expression (10).

$$Iin = (1/2) \times Ipk1 \times (Ton/Tc) \quad (10)$$

The second multiplying circuit 111 generates the first reference voltage S2 proportional to the product of the divided voltage V1' input from the voltage dividing circuit 300 and the error voltage S5 input from the error amplifier 109. As described above, the output portion of the error voltage S5 includes the smoothing circuit having the time constant sufficiently larger than the period of the AC power supply 2. Therefore, the first reference voltage S2 generated in the second multiplying circuit 111 also becomes a substantially constant voltage value in one period of the AC power supply 2. Therefore, because a voltage proportional to the divided voltage V1' (namely to the AC input voltage Vin) is output as the first reference voltage S2, feedback control is performed so that the average output current Tout of the switching power supply circuit 1 becomes constant.

The maximum value Ipk1 of the primary current I1 is controlled to be equal to the first reference voltage S2. Therefore, the maximum value Ipk1 of the primary current I1 is proportional to the AC input voltage Vin. When a proportionality factor is denoted by a, the maximum value Ipk1 of the primary current I1 is expressed by the following expression (11).

$$Ipk1 = \alpha \times Vin \quad (11)$$

In addition, when a primary inductance of the transformer 400 is denoted by L1, the maximum value Ipk1 of the primary current I1 is expressed by the following expression (12).

$$Ipk1 = (Vin \times Ton)/L1 \quad (12)$$

Therefore, the following expression (13) is derived from the above expressions (11) and (12).

$$Ton = \alpha \times L1 \quad (13)$$

Further, the following expression (14) is derived from the above expressions (10), (11), and (13).

$$Iin = (1/2) \times (\alpha \times Vin) \times \{(\alpha \times L1)/Tc\} = \beta \times Vin \quad (14)$$

(Here, $\beta = (1/2) \times (L1/Tc) \times \alpha \times \alpha$ holds.)

It is understood from the above expression (14) that the average input current Iin flowing in the switching power supply device 1 in one period of the switching drive is proportional to the AC input voltage Vin. Therefore, viewing from the AC power supply 2 side, the switching power supply circuit 1 looks like a pure resistor. Therefore, it is possible to achieve a high power factor.

In addition, if the switching power supply circuit 1 of this structural example is used as a power supply of the LED lighting device for performing constant current drive of the LED 3 with power supply from the AC power supply 2, it is possible to perform the constant current drive of the LED 3 and thus to suppress a variation of luminance of the LED lighting device, even if the AC input voltage Vin changes or if Vf (forward drop voltage) of the LED 3 changes. In addition, the switching power supply circuit 1 of this structural example can achieve a higher power factor than the conventional one, and it is possible to suppress a power loss in a power supply system from a power station to a terminal product and to suppress noise jamming to other devices.

<Secondary Current Time Detection Circuit>

Figure 3:
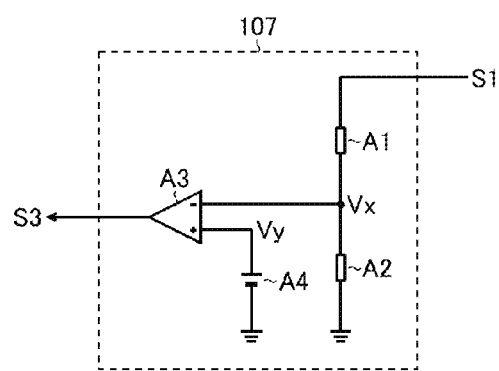
FIG. 3 is a circuit diagram illustrating a structural example of a secondary current time detection circuit 107.

FIG. 3 is a circuit diagram illustrating a structural example of the secondary current time detection circuit 107. The secondary current time detection circuit 107 of this structural example includes resistors A1 and A2, a comparator A3, and a DC voltage source A4. A first end of the resistor A1 is connected to an application end of the winding voltage S1. A second end of the resistor A1 and a first end of the resistor A2 are connected to each other. A second end of the resistor A2 is connected to the ground end. An inverting input terminal (−) of the comparator A3 is connected to a connection node between the resistor A1 and the resistor A2 (application end of the divided voltage Vx corresponding to the winding voltage S1). A non-inverting input terminal (+) of the comparator A3 is connected to a positive electrode end of the DC voltage source A4 (application end of a threshold value voltage Vy). A negative electrode end of the DC voltage source A4 is connected to the ground end. An output end of the comparator A3 is connected to an application end of the secondary current time detection signal S3.

The comparator A3 compares the divided voltage Vx with the threshold value voltage Vy so as to generate the secondary current time detection signal S3. The secondary current time detection signal S3 becomes low level when the divided voltage Vx is higher than the threshold value voltage Vy (when the winding voltage S1 is higher than a predetermined value), and becomes high level when the divided voltage Vx is lower than the threshold value voltage Vy (when the winding voltage S1 is lower than the predetermined value) (see FIG. 2).

In this way, the secondary current time detection circuit 107 utilizes the fact that the winding voltage S1 is generated in the third winding 403 of the transformer 400 in the period during which the secondary current I2 is flowing in the second winding 402 of the transformer 400, so as to detect a time period during which the secondary current I2 is flowing.

<First Multiplying Circuit>

Figure 4:
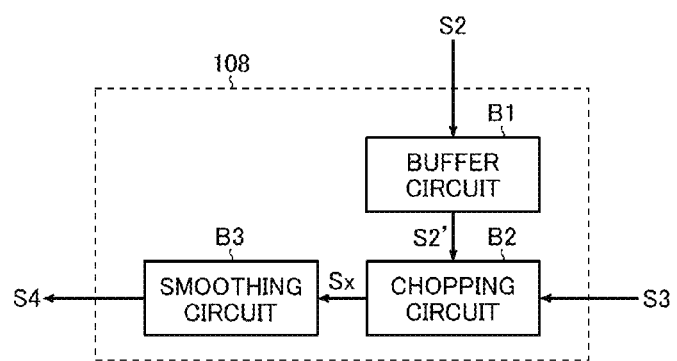
FIG. 4 is a block diagram illustrating a structural example of a first multiplying circuit 108.

FIG. 4 is a block diagram illustrating a structural example of the first multiplying circuit 108. The first multiplying circuit 108 of this structural example includes a buffer circuit B1, a chopping circuit B2, and a smoothing circuit B3.

The buffer circuit B1 generates a first reference voltage S2' obtained by amplifying the current capability of the first reference voltage S2 (voltage value Vm2), and outputs this first reference voltage S2' to the chopping circuit B2.

Figure 5:
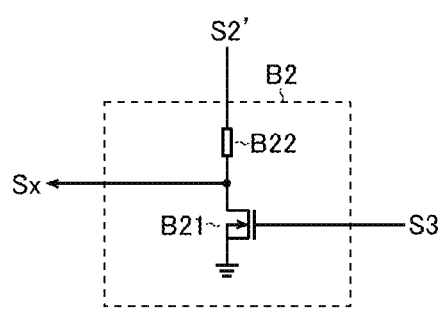
FIG. 5 is a circuit diagram illustrating a structural example of a chopping circuit B2.

The chopping circuit B2 includes an N-channel MOS field effect transistor B21 and a resistor B22 as illustrated in FIG. 5. A drain of the transistor B21 is connected to an application end of the chopping voltage Sx and is also connected to an application end of the first reference voltage S2' via the resistor B22. A source and a back gate of the transistor B21 are connected to the ground end. A gate of the transistor B21 is connected to an application end of the secondary current time detection signal S3.

Figure 6:
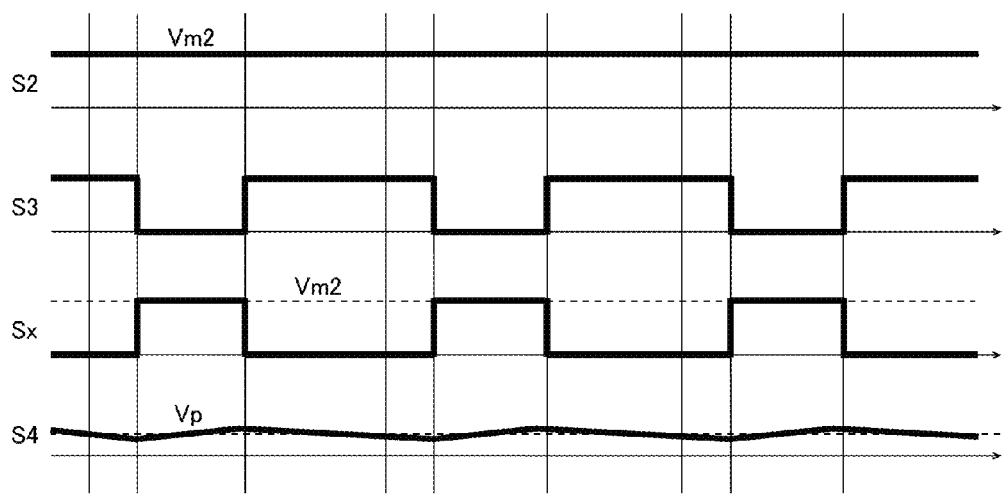
FIG. 6 is a timing chart illustrating voltage waveforms of individual portions of the first multiplying circuit 108.

A resistance value of the resistor B22 should be set to a value smaller than or equal to 1/10 of the input impedance of the smoothing circuit B3. If the secondary current time detection signal S3 is high level, the transistor B21 is turned on, and the chopping voltage Sx becomes low level (0 V). On the other hand, if the secondary current time detection signal S3 is low level, the transistor B21 is turned off, and the chopping voltage Sx becomes high level (Vm2). Therefore, the chopping voltage Sx becomes a rectangular wave corresponding to the secondary current time detection signal S3 as illustrated in FIG. 6.

The smoothing circuit B3 smoothes (averages) the chopping voltage Sx like a rectangular wave so as to generate the multiplied voltage S4. As the smoothing circuit B3, it is possible to use a low-pass filter constituted of a resistor, a capacitor, and the like. As illustrated in FIG. 6, the multiplied voltage S4 increases slowly during a low level period of the secondary current time detection signal S3, and decreases slowly during a high level period of the secondary current time detection signal S3. As the time constant of the smoothing circuit B3 is larger, the change of the multiplied voltage S4 becomes slower, and thus a voltage waveform similar to a direct current is obtained. It is preferred that the time constant of the smoothing circuit B3 should have a value larger than or equal to ten times the period of the switching drive (period of the set signal S7 generated by oscillator circuit 105).

As described above, the first multiplying circuit 108 performs the chopping process of the first reference voltage S2 in accordance with a logical level of the secondary current time detection signal S3 so as to generate the chopping voltage Sx like a rectangular wave, and further smoothes the chopping voltage Sx so as to generate the multiplied voltage S4. By this internal operation, the first multiplying circuit 108 outputs the multiplied voltage S4 proportional to the product of the duty ratio of the secondary current time detection signal S3 (namely, the on-duty ratio of the secondary current I2) and the first reference voltage S2 used as the reference voltage of the voltage comparator circuit 106 (namely, the maximum value Ipk1 of the primary current I1). Note that the voltage value Vp of the multiplied voltage S4 is calculated by the above expression (5) (Vp=(Tres/Tc)×Vm2).

<Error Amplifier>

Figure 7:
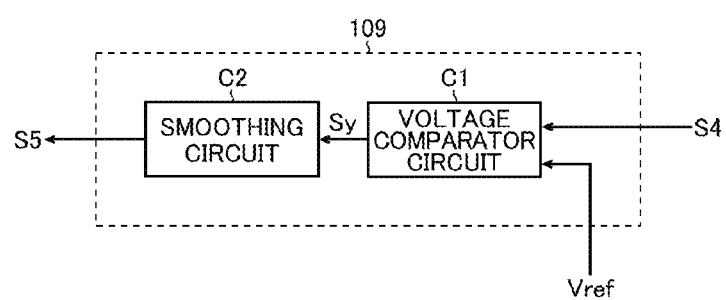
FIG. 7 is a block diagram illustrating a structural example of an error amplifier 109.

FIG. 7 is a block diagram illustrating a structural example of the error amplifier 109. The error amplifier 109 of this structural example includes a voltage comparator circuit C1 and a smoothing circuit C2.

The voltage comparator circuit C1 compares the multiplied voltage S4 with the second reference voltage Vref so as to generate a comparison voltage Sy. The comparison voltage Sy becomes low level when the multiplied voltage S4 is higher than the second reference voltage Vref, and becomes high level when the multiplied voltage S4 is lower than the second reference voltage Vref.

The smoothing circuit C2 smoothes (averages) the comparison voltage Sy so as to generate the error voltage S5. As the smoothing circuit C2, it is possible to use a low-pass filter constituted of a resistor, a capacitor, and the like. It is preferred that the time constant of the smoothing circuit C2 should have a value larger than or equal to ten times the period of the switching drive (period of the set signal S7 generated by oscillator circuit 105). By this setting of the time constant, it is possible to reduce a ripple component of the error voltage S5 to a level causing no problem for practical use.

<Second Multiplying Circuit>

Figure 8:
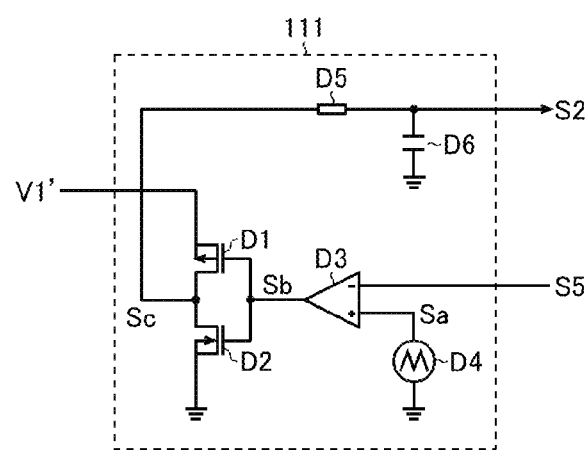
FIG. 8 is a circuit diagram illustrating a first structural example of a second multiplying circuit 111.

FIG. 8 is a circuit diagram illustrating a first structural example of the second multiplying circuit 111. The second multiplying circuit 111 of the first structural example includes a P-channel MOS field effect transistor D1, an N-channel MOS field effect transistor D2, a comparator D3, a triangular wave generation circuit D4, a resistor D5, and a capacitor D6.

A source and a back gate of the transistor D1 are both connected to an application end of the divided voltage V1'. A source and a back gate of the transistor D2 are both connected to the ground end. Drains of the transistors D1 and D2 are both connected to a first end of the resistor D5. Gates of the transistors D1 and D2 are both connected to an output end of the comparator D3. An inverting input terminal (−) of the comparator D3 is connected to an application end of the error voltage S5. A non-inverting input terminal (+) of the comparator D3 is connected to the triangular wave generation circuit D4. A second end of the resistor D5 is connected to an application end of the first reference voltage S2 and is also connected to the ground end via the capacitor D6.

It is desirable to set the oscillation frequency of the triangular wave generation circuit D4 to a value larger than or equal to ten times the switching frequency (frequency of the set signal S7 generated by the oscillator circuit 105). A peak value of a triangular wave voltage Sa is set to be lower than the maximum value of the error voltage S5. A lowest voltage of the triangular wave voltage Sa is set to 0 V.

The comparator D3 compares the error voltage S5 with a triangular wave voltage Sat so as to generate a comparison signal Sb. The comparison signal Sb becomes low level when the error voltage S5 is higher than the triangular wave voltage Sa, and becomes high level when the error voltage S5 is lower than triangular wave voltage Sa. Therefore, as the error voltage S5 is higher, the duty ratio of the comparison signal Sb (ratio of the high level period in one period) becomes smaller. On the contrary, as the error voltage S5 is lower, the duty ratio of the comparison signal Sb becomes larger. In other words, the duty ratio of the comparison signal Sb is modulated so as to be inversely proportional to the voltage value of the error voltage S5 by pulse width modulation (PWM).

The transistors D1 and D2 correspond to first and second switches that are connected in series between the application end of the divided voltage V1 and the ground end, and are turned on and off exclusively in accordance with a logical level of the comparison signal Sb. The transistors D1 and D2 function as the chopping circuit that generates a chopping voltage Sc driven by pulse between the divided voltage VP and the ground voltage (logically inverted signal of the comparison signal Sb). If the comparison signal Sb is high level, the transistor D1 is turned off, and the transistor D2 is turned on. Therefore, the chopping voltage Sc becomes low level (0 V). On the other hand, if the comparison signal Sb is low level, the transistor D1 is turned on, and the transistor D2 is turned off. Therefore, the chopping voltage Sc becomes high level (V1'). By this operation, the divided voltage V1' is chopped in accordance with a logical level of the comparison signal Sb, and the chopping voltage Sc like a rectangular wave is generated from the connection node of the transistors D1 and D2. Therefore, the chopping voltage Sc has a voltage value according to a product of the divided voltage VP and the error voltage S5 (value that is further decreased from the divided voltage V1' in proportion to the error voltage S5).

The resistor D5 and the capacitor D6 constitute the low-pass filter, which smoothes (averages) the chopping voltage Sc like a rectangular wave so as to generate the first reference voltage S2. It is preferred that the time constant of the low-pass filter should have a value more than or equal to ten times the oscillation period of the triangular wave generation circuit D4.

Figure 9:
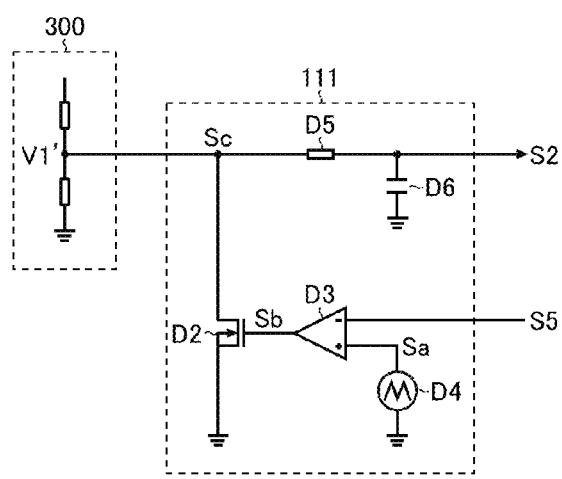
FIG. 9 is a circuit diagram illustrating a second structural example of the second multiplying circuit 111.

FIG. 9 is a circuit diagram illustrating a second structural example of the second multiplying circuit 111. The second structural example has substantially the same structure as the first structural example described above, in which the transistor D1 is removed from the components described in the first structural example. In other words, in the second structural example, the application end of the divided voltage V1 is directly connected to the drain of the transistor D2 without using the transistor D1. Note that the second structural example has the structure suitable for the case where the voltage dividing circuit 300 is formed using a resistor ladder.

The transistor D2 functions as a chopping circuit that makes and breaks the connection between the application end of the divided voltage V1 and the ground end so as to generate the chopping voltage Sc. If the comparison signal Sb is high level, the transistor D2 is turned on. Therefore, the chopping voltage Sc becomes low level (0 V). On the other hand, if the comparison signal Sb is low level, the transistor D2 is turned off. Therefore, the chopping voltage Sc becomes high level (V1'). By this operation, the divided voltage V1' is chopped in accordance with a logical level of the comparison signal Sb so that the chopping voltage Sc like a rectangular wave is generated. Therefore, the chopping voltage Sc has a voltage value corresponding to the product of the divided voltage V1' and the error voltage S5 similarly to the first structural example.

<Oscillator Circuit>

Figure 10:
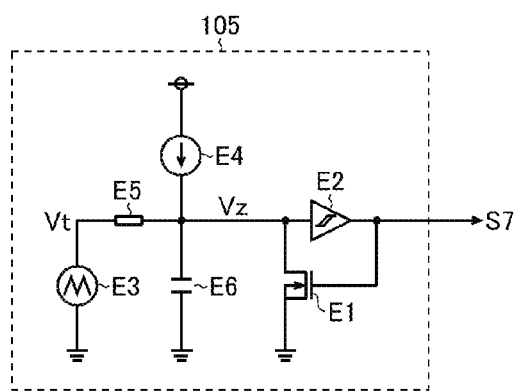
FIG. 10 is a circuit diagram illustrating a structural example of an oscillator circuit 105.
Figure 11:
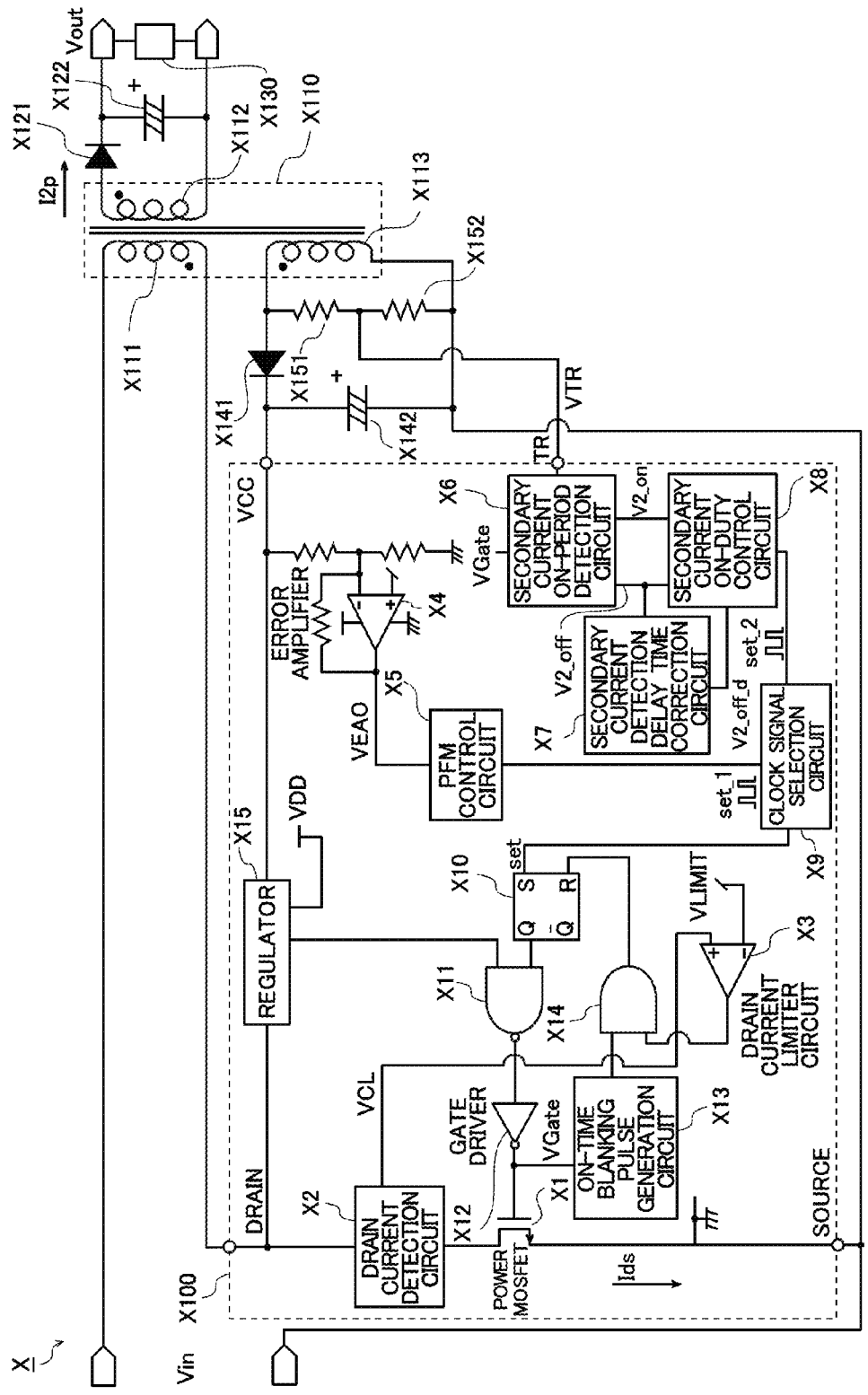
FIG. 11 is a block diagram illustrating a conventional example of the switching power supply device.
Figure 12:
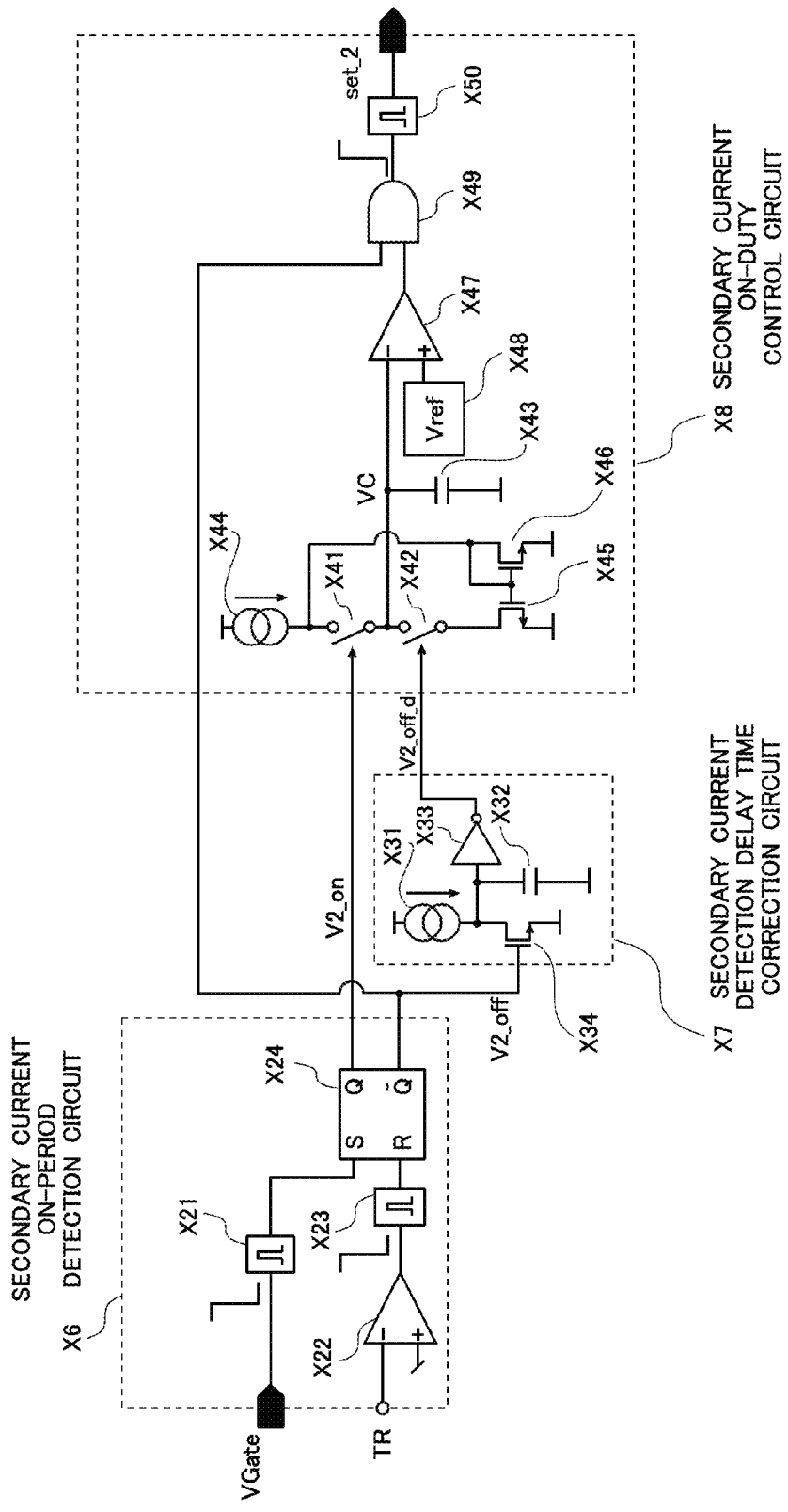
FIG. 12 is a circuit diagram illustrating a principal part of a semiconductor device X100.
Figure 13:
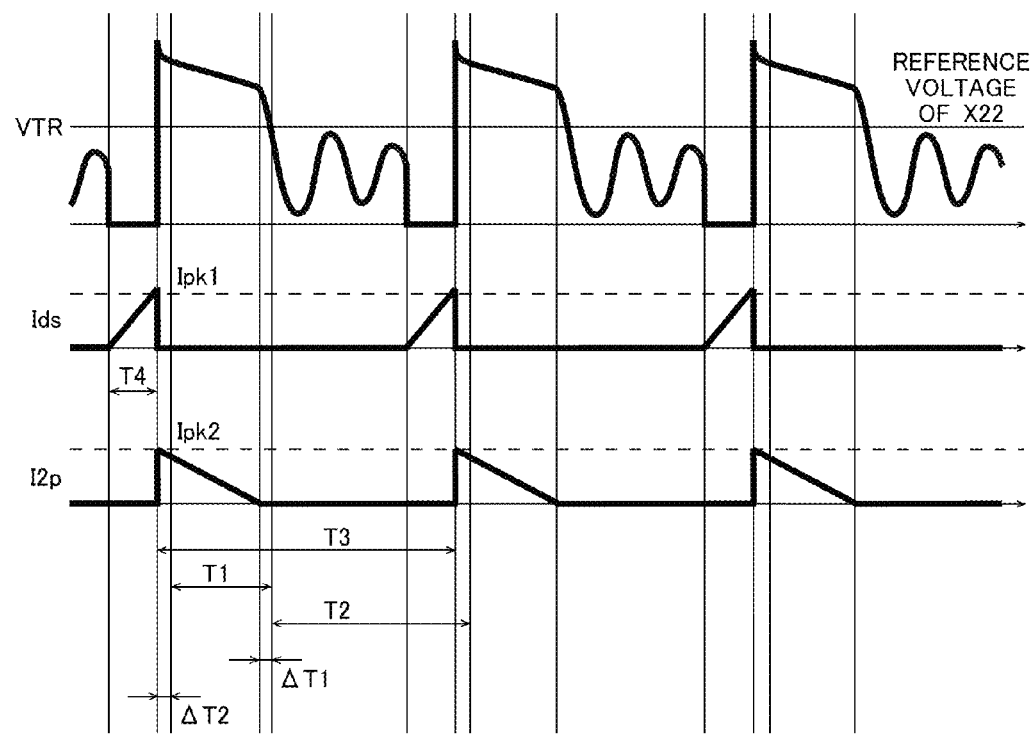
FIG. 13 is a timing chart illustrating a voltage waveform and current waveforms of individual portions of a switching power supply device X.

FIG. 10 is a circuit diagram illustrating a structural example of the oscillator circuit 105. The oscillator circuit 105 of this structural example includes an N-channel MOS field effect transistor E1, a hysteresis comparator (Schmitt trigger) E2, a triangular wave generation circuit E3, a constant current circuit E4, a resistor E5, and a capacitor E6.

A drain of the transistor E1 is connected to an input end of the hysteresis comparator E2. A source and a back gate of the transistor E1 are both connected to the ground end. A gate of the transistor E1 is connected to an output end of the hysteresis comparator E2 and an application end of the set signal S7. A first end of the capacitor E6 is connected to the input end of the hysteresis comparator E2. A second end of the capacitor E6 is connected to the ground end. The constant current circuit E4 is connected between a power supply end and the first end of the capacitor E6. The resistor E5 and the triangular wave generation circuit E3 are connected in series between the input end of the hysteresis comparator E2 and the ground end.

The constant current circuit E4 generates charging current of the capacitor E6. The hysteresis comparator E2 compares a charging voltage Vz at the first end of the capacitor E6 with an internal threshold value voltage Vhys so as to generate the set signal S7. The set signal S7 becomes high level when the charging voltage Vz is higher than the internal threshold value voltage Vhys, and becomes low level when the charging voltage Vz is lower than the internal threshold value voltage Vhys. The transistor E1 functions as a discharge switch that makes and breaks the connection between both ends of the capacitor E6. The transistor E1 is turned on to make the connection between both ends of the capacitor E6 when the set signal S7 is high level, and is tuned off to break the connection between both ends of the capacitor E6 when the set signal S7 is low level.

A basic oscillation operation of the oscillator circuit 105 is described. If the set signal S7 is low level, the transistor E1 is turned off so that the connection between the both ends of the capacitor E6 is broken. Therefore, the capacitor E6 is charged by the constant current circuit E4 so that the charging voltage Vz is gradually increased. After that, when the charging voltage Vz becomes larger than the internal threshold value voltage Vhys of the hysteresis comparator E2, the set signal S7 is raised from low level to high level. As a result, the transistor E1 is turned on, and the both ends of the capacitor E6 are connected. Therefore, the capacitor E6 is discharged by the transistor E1 so that the charging voltage Vz is reset to 0 V. By repeating this operation, pulse oscillation of the set signal S7 is continued. In other words, the transistor E1, the hysteresis comparator E2, the constant current circuit E4, and the capacitor E6 correspond to a charge/discharge circuit that utilizes a charge/discharge operation of the capacitor E6 charged by constant current generate by the constant current circuit E4, so as to generate the set signal S7.

In addition, the oscillator circuit 105 has a function of performing frequency modulation (FM) on the oscillation frequency of the set signal S7 so as to break up the spectrum of the oscillation frequency for suppressing peak power of a switching noise generated from the switching power supply circuit 1 (so-called frequency jitter function). In the oscillator circuit 105, a triangular wave voltage Vt generated by the triangular wave generation circuit E3 is applied to the first end of the capacitor E6 via the resistor E5. The resistor E5 corresponds to a voltage adding resistor that generates the triangular wave voltage Vt to be added to the charging voltage Vz of the capacitor E6. Therefore, charging speed (voltage increasing speed) of the charging voltage Vz changes in accordance with the triangular wave voltage Vt. Specifically, as the triangular wave voltage Vt is higher, the charging speed of the charging voltage Vz becomes higher. On the contrary, as the triangular wave voltage Vt is lower, the charging speed of the charging voltage Vz becomes lower. In other words, as the triangular wave voltage Vt is higher, charging time until the charging voltage Vz reaches the internal threshold value voltage Vhys becomes shorter. On the contrary, as the triangular wave voltage Vt is lower, the charging time until the charging voltage Vz reaches the internal threshold value voltage Vhys becomes longer. A voltage value of the triangular wave voltage Vt changes at a predetermined oscillation period. Therefore, the oscillation frequency of the set signal S7 is modulated in accordance with the triangular wave voltage Vt by FM modulation. Note that an oscillation frequency of the triangular wave oscillator circuit E3 should be set to 1 to 10 kHz. In addition, a resistance value of the resistor E5 should be adjusted so that a frequency deviation becomes 9 kHz or higher.

<Summary>

In the following description, various technical features disclosed in this specification are summarized.

The switching power supply circuit disclosed in this specification includes a full-wave rectification circuit that performs full-wave rectification of an AC input voltage so as to generate a primary voltage, a transformer that transforms the primary voltage into a secondary voltage utilizing electromagnetic induction between first and second isolated windings, a rectifying and smoothing circuit that generates a DC output voltage from the secondary voltage so as to supply the DC output voltage to a load, a primary current control circuit that performs on/off control of primary current based on a result of comparison between a primary current detection voltage corresponding to the primary current flowing in the first winding and a first reference voltage, and a reference voltage correction circuit for monitoring an on-duty ratio of secondary current flowing in the second winding so as to correct the first reference voltage (first structure).

Note that in the switching power supply circuit having the first structure described above, it is preferred to adopt a structure in which the transformer includes a third winding besides the first winding and the second winding, and the reference voltage correction circuit includes a secondary current time detection circuit that monitors a winding voltage in the third winding so as to output a secondary current time detection signal corresponding to an on-duty ratio of the secondary current, a first multiplying circuit that multiplies the secondary current time detection signal by the first reference voltage so as to generate a multiplied voltage, an error amplifier that generates an error voltage corresponding to a difference between the multiplied voltage and the second reference voltage, a voltage dividing circuit that divides the primary voltage so as to generate a divided voltage, and a second multiplying circuit that multiplies the divided voltage by the error voltage so as to generate the first reference voltage (second structure).

In addition, in the switching power supply circuit having the second structure described above, it is preferred to adopt a structure in which the primary current control circuit includes a switching element connected to the first winding, a primary current detection circuit that generates a primary current detection voltage corresponding to the primary current, an oscillator circuit that generates a set signal driven by pulse at a predetermined switching frequency, a voltage comparator circuit that compares the primary current detection voltage with the first reference voltage so as to generate a reset signal, an RS flip-flop that generates a switching control signal based on the set signal and the reset signal, and a buffer circuit that amplifies current capability of the switching control signal so as to output the result to the switching element (third structure).

In addition, in the switching power supply circuit having the third structure described above, it is preferred to adopt a structure in which the first multiplying circuit includes a chopping circuit that performs a chopping process on the first reference voltage in accordance with a logical level of the secondary current time detection signal so as to generate a chopping voltage, and a smoothing circuit that smoothes the chopping voltage so as to generate the multiplied voltage (fourth structure).

In addition, in the switching power supply circuit having the fourth structure described above, it is preferred to adopt a structure in which the chopping circuit includes a switch that is connected between an application end of the chopping voltage and the ground end, and is controlled to be turned on and off in accordance with the secondary current time detection signal; and a resistor connected between an application end of the first reference voltage and the application end of the chopping voltage (fifth structure).

In addition, in the switching power supply circuit having the third structure described above, it is preferred to adopt a structure in which the second multiplying circuit includes a triangular wave generation circuit that generates a triangular wave voltage at a predetermined oscillation frequency, a comparator that compares the error voltage with the triangular wave voltage so as to generate a comparison signal, a chopping circuit that performs a chopping process on the divided voltage in accordance with a logical level of the comparison signal so as to generate a chopping voltage obtained by chopping the divided voltage like a rectangular wave, and a smoothing circuit that smoothes the chopping voltage so as to generate the first reference voltage (sixth structure).

In addition, in the switching power supply circuit having the sixth structure described above, it is preferred to adopt a structure in which the chopping circuit includes a first switch and a second switch that are connected in series between an application end of the divided voltage and the ground end and are exclusively turned on and off in accordance with a logical level of the comparison signal, and the chopping voltage is output from a connection node of the first switch and the second switch (seventh structure).

In addition, in the switching power supply circuit having the sixth structure described above, it is preferred to adopt a structure in which the voltage dividing circuit is formed using a resistor ladder, the chopping circuit includes a first switch connected between an application end of the divided voltage and the ground end, and the first switch is turned on and off in accordance with the comparison signal so that the chopping voltage is output from an application end of the divided voltage (eighth structure).

In addition, in the switching power supply circuit having the third structure described above, it is preferred to adopt a structure in which the oscillator circuit includes a charge/discharge circuit that generates the set signal using a charge/discharge operation of a capacitor charged by constant current, a triangular wave generation circuit that generates a triangular wave voltage at a predetermined oscillation frequency, and a voltage adding resistor that generates a triangular wave voltage to be added to a charging voltage of the capacitor (ninth structure).

In addition, an LED lighting device according to the present invention includes an LED, and a switching power supply circuit that generates a DC output voltage from an AC input voltage supplied from an AC power supply and supplies the DC output voltage to the LED, having any one of the above-mentioned first to ninth structures (tenth structure).

In addition, a semiconductor device according to the present invention has an integrated structure including a primary current control circuit that performs on/off control of primary current based on a result of comparison between a primary current detection voltage corresponding to the primary current flowing in a first winding and a first reference voltage, in a transformer that transforms a primary voltage to a secondary voltage using electromagnetic induction between isolated first and second windings, and a reference voltage correction circuit for monitoring an on-duty ratio of secondary current flowing in the second winding so as to correct the first reference voltage (eleventh structure).

Note that in the semiconductor device having the eleventh structure described above, it is preferred to adopt a structure in which the reference voltage correction circuit includes a secondary current time detection circuit that monitors a winding voltage in the third winding of the transformer so as to output a secondary current time detection signal corresponding to an on-duty ratio of the secondary current, a first multiplying circuit that multiplies the secondary current time detection signal by the first reference voltage so as to generate a multiplied voltage, an error amplifier that generates an error voltage corresponding to a difference between the multiplied voltage and the second reference voltage, and a second multiplying circuit that multiplies a divided voltage obtained by dividing the primary voltage by the error voltage so as to generate the first reference voltage (twelfth structure).

In addition, in the semiconductor device having the twelfth structure described above, it is preferred to adopt a structure in which the primary current control circuit includes a switching element connected to the first winding, a primary current detection circuit that generates a primary current detection voltage corresponding to the primary current, an oscillator circuit that generates a set signal driven by pulse at a predetermined switching frequency, a voltage comparator circuit that compares the primary current detection voltage with the first reference voltage so as to generate a reset signal, an RS flip-flop that generates a switching control signal based on the set signal and the reset signal, and a buffer circuit that amplifies current capability of the switching control signal so as to output the result to the switching element (thirteenth structure).

In addition, in the semiconductor device having the thirteenth structure described above, it is preferred to adopt a structure in which the first multiplying circuit includes a chopping circuit that performs a chopping process on the first reference voltage in accordance with a logical level of the secondary current time detection signal so as to generate a chopping voltage, and a smoothing circuit that smoothes the chopping voltage so as to generate the multiplied voltage (fourteenth structure).

In addition, in the semiconductor device having the fourteenth structure described above, it is preferred to adopt a structure in which the chopping circuit includes a switch that is connected between an application end of the chopping voltage and the ground end, and is controlled to be turned on and off in accordance with the secondary current time detection signal; and a resistor connected between an application end of the first reference voltage and the application end of the chopping voltage (fifteenth structure).

In addition, in the semiconductor device having the thirteenth structure described above, it is preferred to adopt a structure in which the second multiplying circuit includes a triangular wave generation circuit that generates a triangular wave voltage at a predetermined oscillation frequency, a comparator that compares the error voltage with the triangular wave voltage so as to generate a comparison signal, a chopping circuit that performs a chopping process on the divided voltage in accordance with a logical level of the comparison signal so as to generate the chopping voltage, and a smoothing circuit that smoothes the chopping voltage so as to generate the first reference voltage (sixteenth structure).

In addition, in the semiconductor device having the sixteenth structure described above, it is preferred to adopt a structure in which the chopping circuit includes a first switch and a second switch connected in series between an application end of the divided voltage and the ground end, and the first switch and the second switch are exclusively turned on and off in accordance with the comparison signal so that the chopping voltage is output from a connection node of the first switch and the second switch (seventeenth structure).

In addition, in the semiconductor device having the sixteenth structure described above, it is preferred to adopt a structure in which the chopping circuit includes a first switch connected between an application end of the divided voltage and the ground end, and the first switch is turned on and off in accordance with the comparison signal so that the chopping voltage is output from an application end of the divided voltage (eighteenth structure).

In addition, in the semiconductor device having the thirteenth structure described above, it is preferred to adopt a structure in which the oscillator circuit includes a charge/discharge circuit that generates the set signal using a charge/discharge operation of a capacitor charged by constant current, a triangular wave generation circuit that generates a triangular wave voltage at a predetermined oscillation frequency, and a voltage adding resistor that adds the triangular wave voltage to a charging voltage of the capacitor (nineteenth structure).

In addition, the LED lighting device according to the present invention includes an LED, a full-wave rectification circuit that performs full-wave rectification of an AC input voltage so as to generate a primary voltage, a transformer that transforms the primary voltage into a secondary voltage utilizing electromagnetic induction between first and second isolated windings, a rectifying and smoothing circuit that generates a DC output voltage from the secondary voltage and supplies the DC output voltage to the LED, a voltage dividing circuit that divides the primary voltage so as to generate a divided voltage, and the semiconductor device having any one of the above-mentioned eleventh to nineteenth structures (twentieth structure).

<Effects>

Using the technique disclosed in this specification, it is possible to provide the switching power supply circuit that can achieve a higher power factor than the conventional one while maintaining current flowing in the load to be constant, and the semiconductor device used for the switching power supply circuit, and the LED lighting device using them.

In other words, the switching power supply circuit disclosed in this specification can achieve constant current characteristics without causing a drop of output current even if the input voltage is dropped. In addition, the switching power supply circuit disclosed in this specification can achieve a high power factor by one switching element so as to contribute to lower cost of the switching power supply circuit. In addition, the switching power supply circuit disclosed in this specification can realize a high power factor so that losses in an electric power transmission line can be reduced and that noise jamming to other devices can be suppressed.

Note that in order to achieve a high power factor, in general, two electric power conversion systems are necessary, which includes a power factor improving circuit using a step-up converter or passive components for improving the power factor, and a voltage conversion circuit for generating DC voltage from AC voltage (so-called two-converter system). In contrast, the switching power supply circuit disclosed in this specification adopts a system in which the power factor improving function is incorporated (one-converter system) so that a smaller size and lower cost of the system can be achieved.

INDUSTRIAL APPLICABILITY

The switching power supply circuit disclosed in this specification can maintain output current flowing in the load to be constant while achieving a high power factor than the conventional one. Therefore, the switching power supply circuit disclosed in this specification can be used appropriately as a power supply for a load driving device that performs constant current drive of the load by being supplied with electric power from a commercial AC power supply (for example, an LED lighting device).

<Other Variations>

Note that in the embodiments described above, there are described examples of the structure in which the present invention is applied to the switching power supply circuit that is used as the power supply for the LED lighting device. However, applications of the present invention are not limited to this. The present invention can be widely applied to switching power supply circuits for other applications.

In addition, in the above description, the most preferred embodiments of the present invention are described, but it is obvious to those skilled in the art that the disclosed invention can be modified in various ways and can be embodied in different ways from the structure specified in the above description. Therefore, the attached claims are intended to include every variation of the present invention within the technical scope thereof without deviating from the spirit and technical views of the present invention.

LIST OF REFERENCE NUMERALS

| | |
|---|---|
| 1 | switching power supply circuit |
| 2 | AC power supply |
| 3 | load (LED) |
| 100 | semiconductor device |
| 101 | switching element |
| 102 | primary current detection circuit |
| 103 | buffer circuit |
| 104 | RS flip-flop |

-continued

LIST OF REFERENCE NUMERALS

| | |
|---|---|
| 105 | oscillator circuit |
| 106 | voltage comparator circuit |
| 107 | secondary current time detection circuit |
| 108 | first multiplier circuit |
| 109 | error amplifier |
| 110 | reference voltage source |
| 111 | second multiplier circuit |
| 200 | full-wave rectification circuit |
| 300 | voltage dividing circuit |
| 400 | transformer |
| 401 | first winding |
| 402 | second winding |
| 403 | third winding |
| 500 | rectifying and smoothing circuit |
| A1, A2 | resistor |
| A3 | comparator |
| A4 | DC voltage source |
| B1 | buffer circuit |
| B2 | chopping circuit |
| B21 | N-channel MOS field effect transistor |
| B22 | resistor |
| B3 | smoothing circuit |
| C1 | voltage comparator circuit |
| C2 | smoothing circuit |
| D1 | P-channel MOS field effect transistor |
| D2 | N-channel MOS field effect transistor |
| D3 | comparator |
| D4 | triangular wave generation circuit |
| D5 | resistor |
| D6 | capacitor |
| E1 | N-channel MOS field effect transistor |
| E2 | hysteresis comparator |
| E3 | triangular wave generation circuit |
| E4 | constant current circuit |
| E5 | resistor |
| E6 | capacitor |

What is claimed is:

1. A switching power supply circuit comprising:
   a full-wave rectification circuit that performs full-wave rectification of an AC input voltage so as to generate a primary voltage;
   a transformer that transforms the primary voltage into a secondary voltage utilizing electromagnetic induction between first and second isolated windings;
   a rectifying and smoothing circuit that generates a DC output voltage from the secondary voltage so as to supply the DC output voltage to a load;
   a primary current control circuit that performs on/off control of primary current based on a result of comparison between a primary current detection voltage corresponding to the primary current flowing in the first winding and a first reference voltage; and
   a reference voltage correction circuit for monitoring an on-duty ratio of secondary current flowing in the second winding so as to correct the first reference voltage, wherein
   the transformer includes a third winding besides the first winding and the second winding, and
   the reference voltage correction circuit includes
      a secondary current time detection circuit that monitors a winding voltage in the third winding so as to output a secondary current time detection signal corresponding to an on-duty ratio of the secondary current,
      a first multiplier circuit that multiplies the secondary current time detection signal by the first reference voltage so as to generate a multiplied voltage,
      an error amplifier that generates an error voltage corresponding to a difference between the multiplied voltage and a second reference voltage, a voltage dividing circuit that divides the primary voltage so as to generate a divided voltage, and
a second multiplying circuit that multiplies the divided voltage by the error voltage so as to generate the first reference voltage.

2. The switching power supply circuit according to claim 1, wherein the primary current control circuit includes
a switching element connected to the first winding,
a primary current detection circuit that generates a primary current detection voltage corresponding to the primary current,
an oscillator circuit that generates a set signal driven by pulse at a predetermined switching frequency,
a voltage comparator circuit that compares the primary current detection voltage with the first reference voltage so as to generate a reset signal,
an RS flip-flop that generates a switching control signal based on the set signal and the reset signal, and
a buffer circuit that amplifies current capability of the switching control signal so as to output the result to the switching element.

3. The switching power supply circuit according to claim 2, wherein the first multiplying circuit includes
a chopping circuit that performs a chopping process on the first reference voltage in accordance with a logical level of the secondary current time detection signal so as to generate a chopping voltage, and
a smoothing circuit that smoothes the chopping voltage so as to generate the multiplied voltage.

4. The switching power supply circuit according to claim 3, wherein the chopping circuit includes
a switch that is connected between an application end of the chopping voltage and the ground end, and is controlled to be turned on and off in accordance with the secondary current time detection signal, and
a resistor connected between an application end of the first reference voltage and the application end of the chopping voltage.

5. The switching power supply circuit according to claim 2, wherein the second multiplying circuit includes
a triangular wave generation circuit that generates a triangular wave voltage at a predetermined oscillation frequency,
a comparator that compares the error voltage with the triangular wave voltage so as to generate a comparison signal,
a chopping circuit that performs a chopping process on the divided voltage in accordance with a logical level of the comparison signal so as to generate a chopping voltage obtained by chopping the divided voltage like a rectangular wave, and
a smoothing circuit that smoothes the chopping voltage so as to generate the first reference voltage.

6. The switching power supply circuit according to claim 5, wherein the chopping circuit includes a first switch and a second switch that are connected in series between an application end of the divided voltage and the ground end and are exclusively turned on and off in accordance with a logical level of the comparison signal, and the chopping voltage is output from a connection node of the first switch and the second switch.

7. The switching power supply circuit according to claim 5, wherein
the voltage dividing circuit is formed using a resistor ladder,
the chopping circuit includes a first switch connected between an application end of the divided voltage and the ground end, and
the first switch is turned on and off in accordance with the comparison signal so that the chopping voltage is output from an application end of the divided voltage.

8. The switching power supply circuit according to claim 2, wherein the oscillator circuit includes
a charge/discharge circuit that generates the set signal using a charge/discharge operation of a capacitor charged by constant current,
a triangular wave generation circuit that generates a triangular wave voltage at a predetermined oscillation frequency, and
a voltage adding resistor that generates a triangular wave voltage to be added to a charging voltage of the capacitor.

9. An LED lighting device comprising:
an LED; and
a switching power supply circuit that generates a DC output voltage from an AC input voltage supplied from an AC power supply and supplies the DC output voltage to the LED, wherein the switching power supply circuit includes
full-wave rectification circuit that performs full-wave rectification of an AC input voltage so as to generate a primary voltage,
a transformer that transforms the primary voltage into a secondary voltage utilizing electromagnetic induction between first and second isolated windings,
a rectifying and smoothing circuit that generates a DC output voltage from the secondary voltage so as to supply the DC output voltage to a load,
a primary current control circuit that performs on/off control of primary current based on a result of comparison between a primary current detection voltage corresponding to the primary current flowing in the first winding and a first reference voltage, and
a reference voltage correction circuit for monitoring an on-duty ratio of secondary current flowing in the second winding so as to correct the first reference voltage, wherein
the transformer includes a third winding besides the first winding and the second winding, and
the reference voltage correction circuit includes
a secondary current time detection circuit that monitors a winding voltage in the third winding so as to output a secondary current time detection signal corresponding to an on-duty ratio of the secondary current,
a first multiplier circuit that multiplies the secondary current time detection signal by the first reference voltage so as to generate a multiplied voltage.
an error amplifier that generates an error voltage corresponding to a difference between the multiplied voltage and a second reference voltage,
a voltage dividing circuit that divides the primary voltage so as to generate a divided voltage, and
a second multiplying circuit that multiplies the divided voltage by the error voltage so as to generate the first reference voltage.

10. A semiconductor device comprising:
a primary current control circuit that performs on/off control of primary current based on a result of comparison between a primary current detection voltage corresponding to the primary current flowing in a first winding and a first reference voltage, in a transformer that transforms a primary voltage to a secondary voltage using electromagnetic induction between isolated first and second windings, and a reference voltage correction circuit for monitoring an on-duty ratio of secondary current flowing in the second winding of the transformer so as to correct the first reference voltage, wherein the reference voltage correction circuit includes a secondary current time detection circuit that monitors a winding voltage in the third winding of the transformer so as to output a secondary current time detection signal corresponding to an on-duty ratio of the secondary current, a first multiplying circuit that multiplies the secondary current time detection signal by the first reference voltage so as to generate a multiplied voltage, an error amplifier that generates an error voltage corresponding to a difference between the multiplied voltage and a second reference voltage, and a second multiplying circuit that multiplies a divided voltage obtained by dividing the primary voltage by the error voltage so as to generate the first reference voltage.

11. The semiconductor device according to claim 10, wherein the primary current control circuit includes a switching element connected to the first winding, a primary current detection circuit that generates a primary current detection voltage corresponding to the primary current, an oscillator circuit that generates a set signal driven by pulse at a predetermined switching frequency, a voltage comparator circuit that compares the primary current detection voltage with the first reference voltage so as to generate a reset signal, an RS flip-flop that generates a switching control signal based on the set signal and the reset signal, and a buffer circuit that amplifies current capability of the switching control signal so as to output the result to the switching element.

12. The semiconductor device according to claim 11, wherein the first multiplying circuit includes a chopping circuit that performs a chopping process on the first reference voltage in accordance with a logical level of the secondary current time detection signal so as to generate a chopping voltage, and a smoothing circuit that smoothes the chopping voltage so as to generate the multiplied voltage.

13. The semiconductor device according to claim 12, wherein the chopping circuit includes a switch that is connected between an application end of the chopping voltage and the ground end, and is controlled to be turned on and off in accordance with the secondary current time detection signal, and a resistor connected between an application end of the first reference voltage and the application end of the chopping voltage.

14. The semiconductor device according to claim 11, wherein the second multiplying circuit includes a triangular wave generation circuit that generates a triangular wave voltage at a predetermined oscillation frequency, a comparator that compares the error voltage with the triangular wave voltage so as to generate a comparison signal, a chopping circuit that performs a chopping process on the divided voltage in accordance with a logical level of the comparison signal so as to generate the chopping voltage, and a smoothing circuit that smoothes the chopping voltage so as to generate the first reference voltage.

15. The semiconductor device according to claim 14, wherein the chopping circuit includes a first switch and a second switch connected in series between an application end of the divided voltage and the ground end, and the first switch and the second switch are exclusively turned on and off in accordance with the comparison signal so that the chopping voltage is output from a connection node of the first switch and the second switch.

16. The semiconductor device according to claim 14, wherein the chopping circuit includes a first switch connected between an application end of the divided voltage and the ground end, and the first switch is turned on and off in accordance with the comparison signal so that the chopping voltage is output from an application end of the divided voltage.

17. The semiconductor device according to claim 11, wherein the oscillator circuit includes a charge/discharge circuit that generates the set signal using a charge/discharge operation of a capacitor charged by constant current, a triangular wave generation circuit that generates a triangular wave voltage at a predetermined oscillation frequency, and a voltage adding resistor that adds the triangular wave voltage to a charging voltage of the capacitor.

18. An LED lighting device comprising:

an LED, a full-wave rectification circuit that performs full-wave rectification of an AC input voltage so as to generate a primary voltage, a transformer that transforms the primary voltage into a secondary voltage utilizing electromagnetic induction between first and second isolated windings, a rectifying and smoothing circuit that generates a DC output voltage from the secondary voltage and supplies the DC output voltage to the LED, a voltage dividing circuit that divides the primary voltage so as to generate a divided voltage, and a semiconductor device that drives the transformer, wherein the semiconductor device includes a primary current control circuit that performs on/off control of primary current based on a result of comparison between a primary current detection voltage corresponding to the primary current flowing in a first winding of the transformer and a first reference voltage, and a reference voltage correction circuit for monitoring an on-duty ratio of secondary current flowing in the second winding of the transformer so as to correct the first reference voltage, wherein the reference voltage correction circuit includes a secondary current time detection circuit that monitors a winding voltage in the third winding of the transformer so as to output a secondary current time detection signal corresponding to an on-duty ratio of the secondary current, a first multiplying circuit that multiplies the secondary current time detection signal by the first reference voltage so as to generate a multiplied voltage, an error amplifier that generates an error voltage corresponding to a difference between the multiplied voltage and a second reference voltage, and a second multiplying circuit that multiplies a divided voltage obtained by dividing the primary voltage by the error voltage so as to generate the first reference voltage.

* * * * *